3,111,417
NEW ULTRA-VIOLET LIGHT STABILIZED COMPOSITIONS, PROCESSES FOR PREPARING SAME, AND USES THEREOF
Albert F. Strobel, Delmar, and Sigmund C. Catino, Castleton, N.Y., assignors to General Aniline & Film Corporation, New York, N.Y., a corporation of Delaware
No Drawing. Filed Mar. 16, 1960, Ser. No. 15,274
16 Claims. (Cl. 106—195)

This invention relates to new and useful compositions which are characterized as having superior resistance to degradation and deterioration when exposed to actinic radiation and in particular to organic compositions which are protected against deterioration when exposed to such radiations by the incorporation therewith of diphenylmethylenemalononitrile and derivatives thereof. This invention further relates to processes for preventing the deterioration and degeneration of organic materials when exposed to actinic radiations, and in particular to ultra-violet radiations. This invention still further relates to processes for the stabilization against deterioration by ultra-violet light of organic materials by the use of diphenylmethylenemalononitrile and derivatives thereof.

Various organic compounds exhibit the power to absorb electromagnetic radiations within the band of 2900 to 3700 A. and when incorporated in various plastic materials such as transparent sheets, the resultant sheet acts as a filter for all of the radiation passing through and will transmit only such radiations as are not absorbed by the sheet and/or the absorbing agent. It is thus possible to screen out undesirable radiations and utilize the resulting transparent sheet as a filter in many technical and commercial applications such as wrappings for food products and the like.

Numerous organic compounds have been suggested as absorbents for the range of radiations described above, which range is designated as the ultra-violet range. Such uses include incorporation in plastic sheet materials and the stabilization in general of transparent plastic bodies. By far, the greatest concern with respect to ultra-violet radiations is with those radiations which come from the sun. Most of these radiations have wave lengths between 250 and 400 millimicrons. The effects of such radiation on the human skin, producing sunburn and suntan, are of course well known. Other effects, however, of great commercial importance relate to the photochemical degradation caused by ultra-violet radiations. Many commercial products are either unstable when subjected to such radiations, or are effected to the extent that they become undesirable or unsalable. Many plastic materials, when exposed to this radiation, undergo substantial degradation resulting in the development of undesirable color bodies and subsequent loss of transparency. Food products, in addition to becoming discolored, often become unfit for human consumption. Thus, prolonged exposure of fruits, edible oils, butter and other prepared foods will spoil and turn rancid on exposure to ultra-violet light. It is well known that colored object such as dyed textiles will fade on exposure to sunlight, and in particular to ultra-violet light. Many plastics, in addition to developing color formation and reduction in transparency, become brittle, lose their elasticity, crack and eventually completely deteriorate on exposure to sunlight. Paints, varnishes, lacquers and the like also are prone to these effects, even though here the transparency program may not be paramount.

We have discovered that by combining diphenylmethylenemalononitrile and derivatives thereof with organic materials, there results compatible combinations with a vast number of film forming plastics, resins, gums, waxes and the like, which combinations further exhibit outstanding ultra-violet absorbing properties within the generally encountered ultra-violet region of 250 to 400 millimicrons. The compounds which are employed in the compositions and processes of this invention, even though they exhibit outstanding absorbing properties close to the visible region of the electro magnetic field, nevertheless are essentially colorless compounds and can be employed with the assurance that they will not contribute to color in normally colorless formulations, nor will they affect the color of a colored formulation such as a paint film or a dyed textile. Many of the compounds employed in the compositions and processes of this invention also absorb some visible light on the violet end of the spectrum which renders them particularly useful in many formulations which are susceptible to visible light degradation. Thus polyesters and polyethylene are known to be so characterized, and the stabilization of these materials is extremely successful when using the compounds herein contemplated.

The compounds of this invention, additionally, are outstanding in that they do not require a phenolic hydroxyl group in order to achieve light stability. The heretofore used hydroxybenzophenone absorbers must have such a grouping. The presence of an hydroxyl which is capable of salt formation renders these absorbers unsuitable for use in alkaline media and particularly in alkaline plastic materials such as epoxys, melamines and the like. While the compounds employed in the compositions of the present invention do not require an hydroxyl group, the presence thereof is not a disadvantage, or detriment where alkaline sensitivity is no problem.

It is therefore an object of the present invention to provide new and useful compositions characterized by improved resistance to degradation and deterioration by ultra-violet radiation.

It is still another object of this invention to provide compositions containing diphenylmethylenemalononitrile and derivatives thereof which are resistant to ultraviolet deterioration.

It is a still further object of this invention to provide processes for improving the resistance of organic materials to deterioration and degradation by actinic radiation and especially ultraviolet radiation.

It is a still further object of this invention to provide compositions and processes for improving the resistance of organic materials to deterioration and degradation by actinic radiations including short wave length visible radiations.

Other objects and advantages will appear hereinafter as the description proceeds.

The diphenylmethylenemalononitrile and derivatives thereof which are employed in the compositions and processes of this invention are characterized by the following general formula:

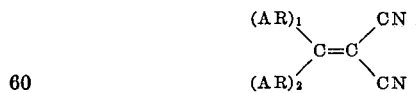

wherein $(AR)_1$ and $(AR)_2$ represent aromatic carbocyclic nuclei devoid of nitro substituents and nuclear bonded amino groups, and more particularly and preferably $(AR)_1$ and $(AR)_2$ represent phenyl rings which may be substituted as, for example, by the various radicals hereinafter to be described. Such substituents include alkyl, alkenyl, aryl, aralkyl, alkaryl, alkoxy, aryloxy, hydroxy, acyloxy, halogen, carboxy, cyano, carbalkoxy, alkoxyalkyl, carboxamide, sulfonamide, and the like.

The following specific substituents may be employed in the carbocyclic nuclei:

Alkyl of from 1 to about 18 carbon atoms, e.g.
    Methyl
    Ethyl
    n-Propyl
    Iso-propyl
    n-Butyl
    Iso-butyl
    t-butyl
    Amyl
    Hexyl
    Octyl
    Decyl
    Lauryl
    Stearyl, and the like Alkoxy of from 1 to about 18 carbon atoms, e.g.
    Methoxy
    Ethoxy
    Hexoxy
    Lauroxy
    Stearoxy, and the like Aryl, for example
    Phenyl
    Tolyl
    Xenyl
    α-Naphthyl
    β-Naphthyl
    Substituted phenyls such as
        Chlorphenyl
        Bromophenyl
        Methoxyphenyl
        Ethoxypenhyl, etc.

Aryloxy, for example
    Phenoxy
    Toloxy
    Xyloxy, and the like

Acyloxy, for example
    Acetoxy
    Propoxy
    Butyroxy
    Valeroxy
    Caproxy
    Lauroxy
    Stearoxy Halogen
    Fluorine
    Chlorine
    Bromine
    Iodine Carbalkoxy
    Carbomethoxy
    Carbethoxy
    Carbopropoxy
    Carbobutoxy, and the like Alkoxyalkyl
    Methoxyethyl
    Methoxypropyl
    Methoxybutyl
    Methoxylauryl, etc.
    Ethoxyethyl
    Ethoxybutyl
    Ethoxylaurly, etc.

Among the specific benzophenone compounds which may be employed in the preparation of the malononitriles employed in this invention and which include the above enumerated types of substituents are the following:

2-methylbenzophenone
3-methylbenzophenone
4-methylbenzophenone
2-chlorobenzophenone
3-chlorobenzophenone
4-chlorobenzophenone
2-bromobenzophenone
3-bromobenzophenone
4-bromobenzophenone
2-iodobenzophenone
3-iodobenzophenone
4-iodobenzophenone
4-fluorobenzophenone
4-cyanobenzophenone
Benzophenonecarboxylic acid(2)
Benzophenonecarboxylic acid(3)
Benzophenonecarboxylic acid(4)
2-benzoylbenzoic acid methyl ester
2-benzoylbenzoic acid ethyl ester
2-benzoylbenzoic acid amide
2-benzoylbenzoic acid monoethyl amide
3-benzoylbenzoic acid methyl ester
3-benzoylbenzoic acid ethyl ester
4-benzoylbenzoic acid methyl ester
4-benzoylbenzoic acid ethyl ester
2-sulfonamidobenzophenone
4-sulfonamidobenzophenone
4-ethylbenzophenone
2,4-dimethylbenzophenone
2,5-dimethylbenzophenone
3,4-dimethylbenzophenone
2,4'-dimethylbenzophenone
3,4'-dimethylbenzophenone
4,4'-dimethylbenzophenone
4-propylbenzophenone
4-isopropylbenzophenone
2,4,5-trimethylbenzophenone
2,4,6-trimethylbenzophenone
2,4,2'-trimethylbenzophenone
2,4,3'-trimethylbenzophenone
2-methyl-5-isopropylbenzophenone
2,3,4,6-tetramethylbenzophenone
2,3,5,6-tetramethylbenzophenone
2,4,2',4'-tetramethylbenzophenone
2,5,2',5'-tetramethylbenzophenone
2,4,3',4'-tetramethylbenzophenone
2,4,6,3',5'-pentamethylbenzophenone
2,2'-dimethyl-5,5'-di-isopropylbenzophenone
4-n-octylbenzophenone
4-cyclohexylbenzophenone
2-benzoylbenzophenone
4,4'-dicyclohexylbenzophenone
4,4'-di-p-toluylbenzophenone
2-phenylbenzophenone
3-phenylbenzophenone
4-phenylbenzophenone
2-propenylbenzophenone
2-allylbenzophenone
N,N-dimethyl-2-sulfonamidobenzophenone
4-phenethylbenzophenone
2-carboxamidobenzophenone
2-hydroxybenzophenone
3-hydroxybenzophenone
4-hydroxybenzophenone
2-methoxybenzophenone
3-methoxybenzophenone
4-methoxybenzophenone
2-ethoxybenzophenone
3-ethoxybenzophenone
4-ethoxybenzophenone
2-phenoxybenzophenone
3-phenoxybenzophenone
4-phenoxybenzophenone
4-xylyloxybenzophenone
4-(m-tolyloxy)benzophenone
4-(p-tolyloxy)benzophenone
4-isopentyloxybenzophenone
2-acetoxybenzophenone
3-acetoxybenzophenone
4-acetoxybenzophenone
4-cyclohexyloxybenzophenone 4-benzyloxybenzophenone
2,4'-difluorobenzophenone
4,4'-difluorobenzophenone
2,4-dibromobenzophenone
2,6-dibromobenzophenone
2,2'-dibromobenzophenone
2,4'-dibromobenzophenone
3,3'-dibromobenzophenone
4,4'-dibromobenzophenone
4,4'-dichlorobenzophenone
2,4-dichlorobenzophenone
2,4'-dichlorobenzophenone
3,4-dichlorobenzophenone
4,4'-di-iodobenzophenone
3,5-di-iodobenzophenone
4-chloro-4'-bromobenzophenone
2,2'-di-iodobenzophenone
2,4-dichloro-2',4'-dibromobenzophenone
2,4,6-tribromobenzophenone
2,4,6-trichlorobenzophenone
2,5,2',5'-tetrachlorobenzophenone
2,4,2'4'-tetrachlorobenzophenone
2-bromo-4'-phenylbenzophenone
2-chloro-4'-phenylbenzophenone
2-bromo-2',4,4',6,6'-pentamethybenzophenone
2-hydroxy-5-octylbenzophenone
4-chloro-3',4'-dimethylbenzophenone
4-chloro-3,4'-dimethylbenzophenone
2-chloro-2',4'-dimethylbenzophenone
2'-bromo-4-methylbenzophenone
2-hydroxy-4-methylbenzophenone
4-hydroxy-2-methylbenzophenone
4-hydroxyethoxybenzophenone
3-hydroxy-4-methoxybenzophenone
2-hydroxy-4-methoxy-3-methylbenzophenone
4'-methoxy-2-methylbenzophenone
4-methoxy-3-methylbenzophenone
6-methoxy-3-methylbenzophenone
6-hydroxy-3-methylbenzophenone
4-methoxy-2-methylbenzophenone
4,4'-dimethoxybenzophenone
4,4'-diethoxybenzophenone
4',4'-di-isopropoxybenzophenone
2,2'-dimethoxybenzophenone
2,3-dimethoxybenzophenone
2,4'-dimethoxybenzophenone
4-methoxy-2,5-dimethylbenzophenone
4-hydroxy-2,5-dimethylbenzophenone
2-hydroxy-3,5-dimethylbenzophenone
5-hydroxy-2,4-dimethylbenzophenone
5-methoxy-2,4-dimethylbenzophenone
5-ethoxy-2,4-dimethylbenzophenone
4-methoxy-3-methyl-6-isopropylbenzophenone
4-hydroxy-3-methyl-6-isopropylbenzophenone
4-hydroxy-2-methyl-5-isopropylbenzophenone
4-acetoxy-2-methyl-5-isopropylbenzophenone
4-acetoxy-3-methyl-5-isopropylbenzophenone
3-ethoxy-3',4,4'-trimethoxybenzophenone
3-ethoxy-3',4,4'-trimethoxybenzophenone
4-ethoxy-3,3',4'-trimethoxybenzophenone
4-(p-methoxyphenyl)-4'-phenylbenzophenone
4,4'-bis(p-methoxyphenoxy)benzophenone
4-(p-hydroxyphenyl)benzophenone
4-(p-methoxyphenyl)benzophenone
4-methoxy-3,5-dimethylbenzophenone
6-ethoxy-3-methylbenzophenone
3-chloro-4(2-hydroxyethoxy)benzophenone
2'-chloro-4-methoxybenzophenone
4'-chloro-4-methoxybenzophenone
3-fluoro-4-hydroxybenzophenone
5-fluoro-2-hydroxybenzophenone
3-fluoro-4-methoxybenzophenone
5-fluoro-2-methoxybenzophenone
4-fluoro-2-methylbenzophenone 4'-bromo-4-hydroxybenzophenone
4'-bromo-4-ethoxybenzophenone
3-iodo-4-methoxybenzophenone
3-iodo-4-hydroxybenzophenone
4'-iodo-4-ethoxybenzophenone
5-chloro-2-hydroxy-4-methylbenzophenone
3'-chloro-2-hydroxy-4-methylbenzophenone
3'-chloro-4-hydroxy-3-methylbenzophenone
3'-chloro-4-methoxy-3-methylbenzophenone
5'-chloro-2'-methoxy-3-methylbenzophenone
5'-iodo-2-hydroxy-3-methylbenzophenone
2'-iodo-6-hydroxy-3-methylbenzophenone
5-iodo-6-hydroxy-3-methylbenzophenone
3'-iodo-4'-methoxy-2-methylbenzophenone
3'-iodo-4'-hydroxy-2-methylbenzophenone
5'-iodo-2'-methoxy-2-methylbenzophenone
5'-iodo-2'-hydroxy-2-methylbenzophenone
4'-bromo-6-hydroxy-3-methylbenzophenone
2'-bromo-6-hydroxy-3-methylbenzophenone
2'-bromo-6-methoxy-3-methylbenzophenone
2-chloro-2'-bromo-4-hydroxybenzophenone
3,5-dibromo-4-hydroxybenzophenone
3,5-dibromo-4-ethoxybenzophenone
3,5-di-iodo-4-hydroxybenzophenone
3,5-dichloro-2,2',4,6'-tetramethoxy-4'-methyl-
    benzophenone
3,3'-difluoro-4,4'-dihydroxybenzophenone
3,3'-difluoro-4,4'-dimethoxybenzophenone
3,3'-difluoro-4,4'-diethoxybenzophenone
3,3'-dibromo-5,5'-difluoro-4,4'-dihydroxybenzophenone
4'-tertiarybutyl-2'-isopropenyl-2,3,5,6-tetra-
    methylbenzophenone
2,2'-dihydroxy-4,4'-dipropoxybenzophenone
2,5-dimethoxy-3,4-dimethylbenzophenone
4,4'-dimethoxy-3,3'-dimethylbenzophenone
2,6-dimethoxy-2'-methylbenzophenone
2,6-dimethoxy-3'-methylbenzophenone
3,3'-diethoxy-4,4'-dimethoxybenzophenone
3,3',4,4',5,5'-hexamethoxybenzophenone
2,2'-dihydroxy-4,4'-bis(octyloxy)benzophenone
2,2'-dihydroxy-4,4'-bis(hexyloxy)benzophenone
3,3'-dimethoxy-4,4'-bis(benzyloxy)benzophenone In addition to the above contemplated derivatives, polyoxyalkylated derivatives of those compounds containing at least one reactive hydrogen atom are within the purview of this invention. From the compounds herein contemplated, the reactive hydrogen containing compounds are the phenols and amides. These are reacted with an alkylene oxide or a compound functioning as an oxide such as ethylene oxide, propylene oxide, butylene oxide, butylene dioxide, cyclohexane oxide, glycidol, epichlorohydrin, butadiene dioxide, isobutylene oxide, styrene oxide and mixtures thereof, and the like, to yield the corresponding polyoxyalkylated product. The resultant phenolic derivatives, e.g., have the following general formula

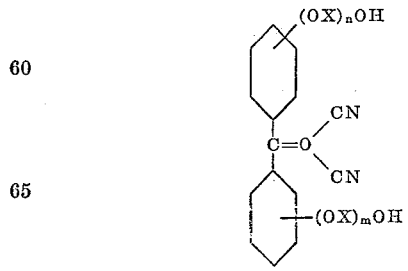

wherein X represents the hydrocarbon residue of the oxyalkylating agent, for example, ethylene (from ethylene oxide and epichlorohydrin), propylene (from propylene oxide), etc. and $n$ and $m$ are integers from 0 to about 100 except that at least one of these is at least 1 and wherein $n$ and $m$ represent the moles of oxyalkylating agent condensed with the phenol.

The general process for the preparation of the compounds of Formula I is well known and involves a condensation of the selected benzophenone or substituted benzophenone with malononitrile in a suitable solvent under such conditions that dehydration occurs to form the substituted ethylene. With benzophenones containing positive substituents and in particular —$CH_3$, $OCH_3$ and the like, it is preferred to employ in place of malononitrile, cyanoacetamide to yield a cyanoamide and then dehydrate the amido group to a nitrile (and, therefore, to yield the dinitrile) by treatment with an excess (5× to 10×) of phosphorous oxychloride ($POCl_3$). The general procedure for this reduction is to heat the intermediate cyanoamido compound with from about 5 to 10 times its weight of $POCl_3$ for 2–4 hours at 55–65° C. The reaction product is then drowned in water, filtered and washed to remove excess $POCl_3$. The following examples will serve to illustrate the preparation and application of the compositions contemplated in the present invention without being deemed limitative thereof.

EXAMPLE 1

*Application of Diphenylmethylenemalononitrile in Nitrocellulose Lacquer*

A mixture of:

20% {48 parts ½ sec. nitrocellulose
2 parts diphenylmethylenemalononitrile
35 parts Cellolyn 502 (a non-drying plasticizing alkyd resin)
15 parts dibutyl phthalate 80% {35 parts butyl acetate
15 parts butanol
50 parts toluene is prepared as a lacquer. This lacquer is drawn out on a metal plate with a Bird film applicator and compared with a similar formulation prepared by replacing the 2 parts of diphenylmethylenemalononitrile with 2 parts ½ sec. nitrocellulose. Film thickness—1 mil. After exposure to light for 100 hours, the film prepared without the diphenylmethylenemalononitrile develops a distinct yellow color whereas the film containing the diphenylmethylenemalononitrile is free from yellow color, i.e., remains colorless.

EXAMPLE 2

*Preparation and Application of 4,4'-Dichlorodiphenyl-methylenemalononitrile to Cellulose Acetate Film*

4,4'-dichlorobenzophenone is condensed with malononitrile as follows:

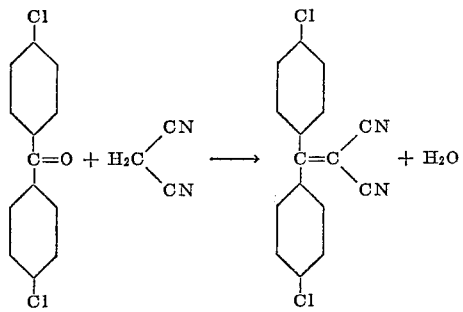

Into a 500 ml. flask fitted with stirrer, thermometer, reflux condenser, water trap and heating mantle there is charged:

16.5 gms. malononitrile (0.25 mole)
62.75 gms. 4,4'-dichlorobenzophenone (0.25 mole)
3.85 gms. ammonium acetate
12 ccs. glacial acetic acid
75 mls. benzene The charge is stirred 12 hours at reflux. The benzene is distilled off, the residue diluted with 150 mls. water and filtered. The lumps are crushed in a mortar. The solid is slurried in 100 mls. water and filtered. The cake is washed on the funnel with 200 mls. water. The product is air dried. It is distilled at 0.5 mm. at 185°–200° C. The 18.5 g. material remaining is recrystallized from 150 mls. ethanol plus 300 mls. water after nucharing.

Incorporation of this material into cellulose acetate is carried out as follows:

0.375 gm. 4,4'-dichlorodiphenylmethylenemalononitrile
3.5 gms. ethanol
6.5 gms. methyl Cellosolve (ethylene glycol monomethyl ether)
9.0 gms. ethyl acetate
26 gms. cellulose acetate dope (consisting of 3.75 gms. cellulose acetate in 21 gms. acetone)

are mixed with stirring until a clear solution is obtained. The material was poured into a mold and the solvent evaporated to give a block of cast material of ⅛" thickness. A similar block was prepared in the same fashion and omitting the 4,4'-dichlorodiphenylmethylenemalononitrile. The material containing the ultraviolet absorber gave better stability to light exposure to food stored behind it than the cast block without the ultraviolet absorber.

EXAMPLE 3

*Preparation and Application of Phenyl-4-n-Dodecyloxyphenylmethylenemalononitrile in Polyethylene*

4-n-dodecyloxybenzophenone (prepared as described below) is condensed with malononitrile in the manner described above for the condensation of 4,4'-dichlorobenzophenone with malononitrile. The 4-n-dodecyloxybenzophenone is prepared by alkylation of 4-hydroxybenzophenone with n-dodecyliodide as follows:

300 mls. of n-butyl alcohol and 4.0 gms. of sodium hydroxide pellets are mixed and after agitation for 1 hour 19.8 gms. 4-hydroxybenzophenone (0.1 mole) are added. 44.2 gms. (=0.15 mole) of 1-iodo-n-dodecane are then added. The charge is stirred 15 hours at 68° C., cooled to room temperature, and diluted to 1 liter volume with methanol. There is added 1.5 mls. of sodium hydroxide (30%) bringing the material to phenolphthalein alkalinity. The material is filtered to give 4-n-dodecyloxybenzophenone.

Application of phenyl-(4-n-dodecyloxyphenyl)-methylene-malononitrile to polyethylene is carried out as follows:

0.5 gm. of the above ultraviolet light absorber
99.5 gms. polyethylene wax are melted at 120° C. to give a solution. The material is then pressed out in a Carver press to give a film of about ⅛" thickness. Meat stored behind the film containing absorber is less discolored on exposure to light than meat behind similar film prepared without absorber.

EXAMPLE 4

*Preparation and Application of 4-Chlorophenyl-4'-Methoxyphenylmethylenemalononitrile to Furniture Polish*

4-chloro-4'-methoxybenzophenone is condensed with malononitrile in the manner described for 4,4-dichlorobenzophenone in Example 2.

A melt is made on a steam bath of 9 oz. carnauba wax
1.5 pints turpentine
1.75 pints hot water containing 2 oz. soap.

The whole mixture is beaten to an emulsion with a Waring Blendor. A similar formation is made containing 2% of the weight of carnauba wax of the ultraviolet absorber; 4-chlorophenyl-4'-methoxyphenylmethylenemalononitrile.

The formulation containing the ultraviolet absorber when applied to stained and varnished oak gives better protection against discoloration (darkening) by light than the formulation free of absorber.

EXAMPLE 5

*Preparation and Application of 2,4'-Dichlorodiphenylmethylenemalononitrile to Polyester Film*

2,4'-dichlorodiphenylenemalononitrile is made from 2,4'-dichlorobenzophenone and malononitrile as described in Example 2. Application of this material to polyester resin (Mylar) is carried out as follows:

0.25 gm. of the ultraviolet light absorber is dissolved in 100 gms. of Polylite 8000 (30% styrene–70% glyceryl phthalate maleate) containing 1% Luperco ATC (benzoyl peroxide). A casting is made between opal glass plates treated with a silicone mold release agent (Dri-Film SC–87). A gasket material of tubing is placed between the plates and the latter are clamped together. The polyester is poured into the mold and cured as follows:

Initial oven temperature —65° C. The temperature is raised slowly to 90° C. and the material is held at this temperature 1 hours. The temperature is then raised to 120° C. and held ½ hour to complete the curing cycle. The material is cut to size. The polyester mold made in this way gives better protection against sunlight to fruit and meat stored behind it when containing ultraviolet absorber than a casting prepared in similar fashion but free of ultraviolet absorber.

EXAMPLE 6

*Application of Phenyl-(4-Methoxyphenyl)-Methylenemalononitrile to Methacrylate Ester polymers on Leather*

In a 1 quart small neck liquid bottle was added 160 gms. methylacrylate, 1.7 gms. phenyl-4-(methoxyphenyl)-methylenemalononitrile, 20 gms. Triton X–200 (an alkyl aryl polyether sulfonate dispersing agent), 0.3 gm. ammonium persulfate, and 176 gms. water.

The above mixture was shaken to a uniform emulsion (a white milk like liquid) then gradually poured into 500 mls. water over a 2½ hour period. The material was refluxed 3 hours.

This peroduct was then sprayed on leather. The leather was pressed between plates and dried. Leather treated with this formulation showed less tendency toward yellowing than leather treated with a similar formulation omitting the ultraviolet absorber.

EXAMPLE 7

*Preparation and Application of 4,4'-Ditolylmethylenemalononitrile to Snythetic Rubber*

4,4'-ditolylmethylenemalononitrile is prepared from 4,4'-dimethylbenzophenone and malononitrile as described in Example 2. Application of this ultraviolet absorber to rubber is carried out as follows:

A 50% dispersion is made of the above ultraviolet absorber by kneading 20 gms. of the compound with 20 gms. of formaldehyde-naphthalene-2-sodium sulfonate (Tamol NNO) in a Werner-Pfleiderer mixer for several hours in the presence of sufficient water to keep the material in a viscous state. The material is then evaporated to dryness to give the dispersed form of the absorber.

The dispersed absorber is incorporated in an acrylonitrilebutadiene latex (Chemigum 247) as described in Example 6, 5% of the weight of latex of absorber being used. The film prepared in this fashion using absorber showed less tendency to yellow on exposure to ultraviolet light than a film prepared in the same manner but omitting the ultraviolet absorber.

EXAMPLE 8

*Application of Diphenylmethylenemalononitrile to Foamed Polyvinyl Chloride*

A 5% solution of diphenylmethylenemalononitrile is prepared in methyl Cellosolve. Into this solution is immersed a sponge of foamed polyvinyl chloride (formulation of sponge described below). The sponge is removed, squeezed free of residual solvent and dried in a vacuum oven. The material thus impregnated with ultraviolet absorber is more stable to ultraviolet light than sponge untreated with ultraviolet absorber.

Formulation of the polyvinyl chloride sponge is as follows:

|  | Parts |
|---|---|
| Marvinol VR–10 (polyvinyl chloride resin) | 100 |
| Di-2-ethylhexylphthalate (DOP) | 130 |
| Barium-cadmium stabilizer (Advance BC–105) | 3.5 |
| Celogen (p,p'-oxybisbenzene sulfonyl hydrazide) | 25.0 |
|  | 258.5 |

EXAMPLE 9

*Application of Di-(4-Hydroxyphenyl)Methylenemalononitrile to Foamed Polyurethane*

A 5% solution of di-(4-hydroxyphenyl)methylenemalononitrile is prepared in methyl Cellosolve. Into this solution is immersed a sponge made from a linear polyester (adipic acid-ethylene glycol) with a hydroxyl number of 45 and an acid number of 1 foamed with tolylenediisocyanate. The sponge is then removed, squeezed free of residual solvent and vacuum oven dried. The impregnated material undergoes less yellowing on exposure to ultraviolet light than untreated material.

EXAMPLE 10

*Preparation of Phenyl-(4-Biphenyl)-Methylenemalononitrile and Application to Cellulose Acetate*

Phenyl-(4-biphenyl)-methylenemalononitrile is prepared from 4-phenylbenzophenone and malononitrile in the same manner as the compound of Example 2. This compound is applied in cellulose acetate as the compound of Example 2.

EXAMPLE 11

*Application of Di-(4-Methoxyphenyl)-Methylenemalononitrile to the Stabilization of Coloring Matters Incorporated in Plastics*

A lacquer drawdown on "Krome-Kote" paper (a cast coated paper) of 2% of Azosol Fast Yellow RCA (anthranilic acid diazo→1-phenyl-3-methyl-5-pyrazolone-4-sulfonic acid, Cr complex, dicyclohexylamine salt), 2% of di-(4-methoxyphenyl)-methylenemalononitrile in nitrocellulose was made as well as a comparative nitrocellulose lacquer formulation containing 2% Azosol Fast Yellow RCA without ultraviolet absorber. After 500 hours' fadeometer exposure, the lacquer containing the ultraviolet absorber showed less fading.

EXAMPLE 12

The procedure of Example 9 is repeated except that the benzenesulfonyl bis-ester is employed in lieu of the bis-hydroxy compound described in that example. Similar outstanding protection is afforded the polyurethane.

The ester is prepared in the following manner. 1 mole of di-(4-hydroxyphenyl)-methylenemalononitrile is dissolved in 4 moles of pyridine. The mixture is maintained at about 10° C. At this temperature there is slowly added 1.1 moles of benzene sulfonyl chloride over a period of 15 minutes. The mixture is then heated gently at 50° C. for 35 minutes, allowed to cool to room temperature, and then drowned in ice water containing sufficient hydrochloric acid to neutralize the pyridine. The resultant precipitate is the bis-benzenesulfonate ester. The material is purified by recrystallization from an aqueous methanol medium containing equal parts of alcohol and water.

EXAMPLE 13

The procedure of Example 2 is repeated except that the corresponding 4,4'-dibromo derivative is employed in the cellulose acetate film. This derivative is prepared as described in that example except that 0.25 mole of 4,4'-dibromobenzophenone are employed in the preparation of the malononitrile.

EXAMPLE 14

The procedure of Examples 1 and 2 are repeated except that the absorber employed is phenyl-4-hydroxyphenylmethylenemalononitrile. Comparable protection is obtained with this reagent. The compound is prepared similarly as that described in Example 2 except that 4-hydroxybenzophenone is employed in lieu of the 4,4'-dichlorobenzophenone of Example 2.

EXAMPLE 14-A

*Preparation of 3,4-Dimethyldiphenylmethylenemalononitrile*

½ mole of malononitrile and ½ mole of 3,4-benzophenone are charged into a 1500 ml. flask equipped with a stirrer, thermometer, reflux condenser, heating mantle and water trap, along with 6½ g. of ammonium acetate, 20 cc. of glacial acetic acid and 200 mls. of benzene. The reaction mixture is heated to reflux and maintained there for 10 hours with constant stirring. The benzene is then distilled off and the residue diluted with 250 mls. of water and thereafter filtered. The solid residue is again slurried in 250 mls. of water and once more filtered. The resultant product is recrystallized from dilute ethanol.

An alternative procedure for the preparation of this compound is as follows:

100 g. of 3,4-benzophenone
45 g. cyanoacetamide
250 ml. benzene
6 g. ammonium acetate
25 cc. glacial acetic acid are charged into a 2 liter flask heated to reflux and maintained at reflux for 6 hours. The benzene is distilled and the residue diluted with 300 mls. water and filtered. The crude product is washed with 1 liter of water and then recrystallized from dilute ethanol.

EXAMPLE 14-B

The product of Example 14-A is incorporated into a cellulose acetate film similarly as described in Example 2 employing the same composition disclosed therein. Outstanding stability is obtained.

EXAMPLE 14-C

The ultraviolet absorber of 14-A is employed in the preparation of a nitrocellulose film in the manner described in Example 1, substituting therein 3,4-dimethyldiphenylmethylenemalononitrile for the ultraviolet absorber of that example.

EXAMPLE 14-D

The compound of Example 14-A is incorporated into a furniture polish of the following composition: 10 oz. carnauba wax, 1.7 pints turpentine, 2.0 pints water, 1.6 oz. sodium lauryl sulfate, 1% of the absorber is used based on the weight of the wax content. The resultant polish gives outstanding protection to varnished wood and prevents the darkening thereof upon exposure to actinic radiation.

EXAMPLE 15

The compound described in Example 14 is ethoxylated with ethylene oxide to yield a polyoxyalkylated product in the following manner. To 1 mole of the phenol containing 1% by weight based on the weight of the phenol of potassium hydroxide there are added 6 moles of ethylene oxide while maintaining the mixture in an autoclave at 80° C. during the addition of the ethylene oxide. The resultant product disperses readily in water and may be used to treat hydrophylic materials such as paper and other cellulosic products such as cotton, jute and the like. This polyoxyalkylated product is also an excellent dispersing agent for pigments and dyestuffs, and when used in combination with these materials, it affords outstanding protection against ultraviolet light degradation.

EXAMPLE 16

The procedure of Example 15 is repeated except that 30 moles of ethylene oxide are reacted with the hydroxyl group of the malononitrile. The resultant product has excellent surface active properties and may be employed in the preparation of oil-in-water and water-in-oil emulsions whereby not only are the surface active properties taken advantage of, but the resultant composition admirably protected against degradation by ultraviolet light.

EXAMPLE 17

The bis-hydroxy compound of Example 9 is treated with ethylene oxide in the manner described in Example 15 to yield a product containing 12 moles of ethylene oxide per mole of malononitrile compound. The product is an excellent emulsifier and may be employed in hydrophilic systems for ultraviolet protection.

EXAMPLE 18

The procedure of Example 17 is repeated to yield a product containing 35 moles of ethylene oxide per mole of malononitrile. This product may be used similarly as the other above described surfactant type products, and is particularly useful in conjunction with soap and detergent products which are prone to degradation by ultraviolet light.

EXAMPLE 19

This example illustrates the outstanding improvement effected by the compounds herein disclosed in protecting and stabilizing high polymers of formaldehyde.

A. *Preparation of Polymer (Polyoxymethylene)*

A solution of monomeric formaldehyde prepared in the manner hereinafter described in 800 ml. of dimethyl ether of 3,4-dimethyldiphenylmethylenemalononitrile is stirred at −101° C. to −105° C. while gradually adding, over a period of about 30 min., 0.02 mole percent based on the weight of the formaldehyde a triphenyl phosphine dissolved in 40 ml. of diethyl ether. Stirring is continued for an additional 70 min. and the resultant slurry is filtered and the solid product washed with 2 portions of diethyl ether (650 ml. each), the first portion at a temperature of solid carbon dioxide/acetone bath and the second at room temperature. This washed product is then air dried and finally vacuum dried. The resultant polymer is mixed with 1% of its weight of product and films of the resultant polymer are formed at 190–200° C. and 2000 p.s.i. pressure.

The procedure of Part A is repeated except that the 3,4-dimethyldiphenylmethylenemalononitrile is omitted. The films so prepared are placed in a weatherometer and 30 days it is observed that the film with the stabilizer is substantially unchanged, there being no sign of degradation as evidenced by surface crazing and cracks. The unstabilized film shows severe crazing and cracks.

B. *Preparation of Monomeric Formaldehyde Used in Part A*

The monomeric formaldehyde used in the preparation of the polymer described in Part A is prepared by the thermal decomposition of α-polyoxymethylene is heated to between 150° C. and 300° C. under a pressure of 100 to 125 mm. whereby decomposition to formaldehyde takes place. The vaporized formaldehyde is then passed through a battery of 12 U-tubes maintained at −40° C. to a suitable collection flask containing a solvent cooled to about −80° C.

C. The α-polyoxymethylene used to prepare the monomeric formaldehyde in Part B and employed to prepare the polymer of Part A is produced as follows:

1000 g. of a 33% aqueous sodium hydroxide solution is added slowly over a period of 2 hours to 84.4 kg. of 39.8% aqueous formaldehyde free of methanol. During the addition, the mass is vigorously agitated and the temperature controlled at 40° C. Stirring is continued for an additional 12 hours. The mass is then filtered and washed with water until the filtrate is neutral and thereafter washed with methanol. There results a powdery white solid which is dried in a vacuum oven at 40° C. for 48 hours.

EXAMPLE 20

Example 19 is repeated except that 5 g. of the malononitrile are mixed with 95 g. of vacuum dried polymer and heat set at 190° C. as above. The resultant polymer is found to contain about 5% of this additive in contrast to about 1% in the product of Example 19. Excellent stabilization of the polyoxymethylene is obtained.

EXAMPLE 21

A high molecular weight formaldehyde polymer is prepared similarly as in Example 20 without any ultraviolet light absorber. To 100 g. of granular polymer there is added and thoroughly admixed therewith, 2 g. of 4,4'-dichlorodiphenylmethylenemalonitrile. Films are then prepared from this composition in the manner described in Example 19. Excellent stabilization is effected thereby.

Examples 19 through 21 are repeated employing as the ultraviolet absorber, however, (1) Diphenylmethylenemalonitrile
(2) 2,4'-dichlorodiphenylmethylenemalonitrile
(3) Di-(4-methoxyphenyl)-methylenemalonitrile
(4) Phenyl-(4-n-dodecyloxyphenyl)-methylene-malonitrile The improvement in the stability of the polyoxymethylenes above described is deemed remarkable in view of the fact that many other ultra-violet absorbing materials have proved to be completely worthless in such combinations. It is significant that the compounds herein contemplated as stabilizers may be employed during the polymerization of the formaldehyde and do not adversely affect the course thereof.

EXAMPLE 22

A. A 10 g. swatch of "Dacron" (polyethylene glycol terephthalate) is dyed in 300 cc. of water containing dispersed therein ¼% of Celliton Turquoise MG (a disperse dye of General Dyestuff Corporation described in the AATCC Year Book, 1959, page 246) at 190° F. for 1 hr.

0.05 gm. of p-anisyl-3,4-xylylmethylenemalononitrile dissolved in 5 mls. of dimethylformamide is added to the dyebath and dyeing continued for 1 hour. The swatch is then removed, rinsed and dried.

A fadometer test for 20 hours is run employing this piece of dyed material against a similar dyeing wherein the material is not treated with ultra-violet agent. The treated dyeing shows much better light fastness than the untreated dyeing.

B. A swatch of nylon is dyed in similar manner. The dyeing treated with ultra-violet agent is considerably better than the untreated dyeing.

EXAMPLE 23

A. As in Example 22, a 10 g. swatch of "Dacron" is dyed employing instead of Celliton Turquoise MG, Celliton Fast Yellow GA, which is a disperse dye of the formula:

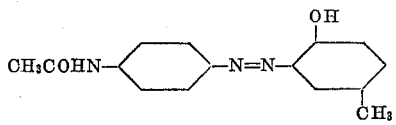

and instead of the ultra-violet agent of that example, bis-(p-anisyl)methylenemalononitrile is employed. The dyeing treated with ultra-violet agent is superior to a similar dyeing which is not treated with ultra-violet agent after 20 hours' exposure in a fadometer.

B. Part A is repeated, the difference being that a nylon swatch is dyed instead of "Dacron." The dyeing treated with ultraviolet agent is superior to a similar dyeing which is not treated with ultra-violet agent after 20 hours' exposure in a fadeometer.

The compounds employed in this invention are in general soluble in a great variety of solvents, plastics, resins, waxes and the like, and therefore are particularly adaptable for the stabilization of a great variety of different types of organic materials. The non-oxyalkylated products are insoluble in water. Those compounds which contain smaller amounts of oxyalkyl groups, that is, up to about 4 to 6 groups per molecule, are in general soluble in the more polar organic solvents and fairly readily dispersible in water. The compounds containing larger amounts of alkylene oxide, that is, above about 6 moles per mole of reactive hydrogen containing compound, range from soluble to extremely soluble in water, the solubility increasing as the number of oxyalkyl groups are increased.

The amount of stabilizer to be incorporated is not particularly critical except that sufficient should be present to effect the desired degree of stabilization, and no more should be employed than is necessary to obtain this result. In general, between 0.1% and 10% based on the solids content of the organic material may be used, and preferably between about 0.5% to about 2%. As exemplified above, the ultraviolet absorbers employed with this invention can be used not only to stabilize clear films, plastics and the like, but they may be employed in opaque, semi-opaque or translucent materials, the surface of which is susceptible to degradation by ultraviolet light. Among such different types of materials, most of which have been exemplified, are foamed plastics, opaque films and coatings, opaque papers, translucent and opaque fibers, transparent and opaque colored plastics, fluorescent pigments, polishes, creams, lotions and the like whether opaque, clear, or translucent. The compounds employed in this invention give outstanding protection to paint, enamel and varnish films against fading of pigments and dyes contained therein. The most outstanding and significant achievement of the compounds used in this invention lies in the remarkable ability of these compounds to protect and stabilize polyoxymethylene and nitrocellulose containing compositions against ultra-violet light degradation. The compounds used in the compositions of this invention have been found to be at least five times as effective in such stabilizing situations as the heretofore employed hydroxybenzophenones known for such uses.

The compounds used in the present invention have also been found to be admirably suited for incorporation into the transparent or translucent backings of the various pressure sensitive type adhesive tapes presently in common use. By the employment of these compounds in such a manner, the adhesive nature of the pressure sensitive adhesive is remarkably preserved. Not only may the compounds be incorporated directly into the backing, but they may be used as an overcoating in a transparent or translucent film coating base employing as the film former, any suitable material which will adhere to the tape back. Thus in the case of a regenerated cellulose tape, one may coat the back thereof with one of the cellulosic lacquers hereinbefore described in Examples 1 and 2. For direct incorporation into a film or regenerated cellulose, one may employ any of the compounds herein disclosed, and particularly those which have been polyoxyalkylated as described, for example, in Example 17. In this instance, it is preferred to impregnate the regenerated cellulose in the gel state before final drying thereof.

Other variations in and modifications of the described processes which will be obvious to those skilled in the art can be made in this invention without departing from the scope or spirit thereof. This application is a continuation-in-part of application Serial No. 781,893, filed December 22, 1958, now abandoned.

We claim:

1. A composition comprising an organic plastic material susceptible to ultra-violet light degradation having uniformly dispersed therein at least about 0.1% by weight based on the weight of the organic plastic material of a compound of the formula:

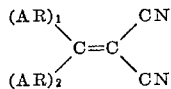

wherein $(AR)_1$ and $(AR)_2$ are aromatic carbocyclic nuclei devoid of nitro substituents and nuclear bonded amino groups.

2. A composition comprising cellulose acetate and from about 0.1 to about 10% by weight based on the weight of the cellulose acetate of 4,4'-dichlorodiphenylmethylenemalononitrile.

3. A composition comprising polyethylene and from about 0.1 to about 10% by weight based on the weight of said polyethylene of a compound of the formula:

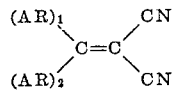

wherein $(AR)_1$ and $(AR)_2$ are aromatic carbocyclic nuclei devoid of nitro substituents and nuclear bonded amino groups.

4. A composition as defined in claim 3 wherein the said malononitrile is phenyl -(4-n-dodecyloxyphenyl)-methylenemalononitrile.

5. A composition comprising a synthetic rubber and dispersed therethrough at least about 0.1% by weight based on the weight of the synthetic rubber of a compound of the formula:

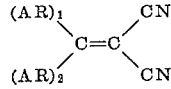

wherein $(AR)_1$ and $(AR)_2$ are aromatic carbocyclic nuclei devoid of nitro substituents and nuclear bonded amino groups.

6. A composition as defined in claim 5 wherein the dispersed compound is 4,4'-ditolylmethylene malononitrile.

7. A composition comprising an organic coloring material susceptible to ultra-violet degradation and admixed therewith from about 0.1 to about 10% by weight based on the weight of said organic coloring material of a compound of the formula:

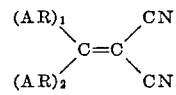

wherein $(AR)_1$ and $(AR)_2$ are aromatic carbocyclic nuclei devoid of nitro substituents and nuclear bonded amino groups.

8. A composition as defined in claim 7 wherein the said malononitrile is di-(4-methoxyphenyl)-methylenemalononitrile.

9. A composition as defined in claim 1 wherein the organic plastic is a polyester.

10. A composition as defined in claim 9 wherein the malononitrile is 2,4'-dichlorodiphenylmethylenemalononitrile.

11. An ultra-violet absorbing composition as defined in claim 1 wherein the absorber is 3,4-dimethyldiphenylmethylenemalononitrile.

12. An ultra-violet absorbing composition comprising nitro cellulose and as an absorber for ultra-violet radiation from about 0.1 to about 10% based on the weight of said nitro cellulose a compound of the formula:

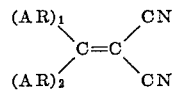

wherein $(AR)_1$ and $(AR)_2$ are aromatic carbocyclic nuclei devoid of nitro substituents and nuclear bonded amino groups.

13. A composition as defined in claim 12 wherein $(AR)_1$ and $(AR)_2$ are benzene nuclei.

14. A composition as defined in claim 12 wherein $(AR)_1$ and $(AR)_2$ are phenyl.

15. A composition as defined in claim 12 wherein the absorber for ultra-violet radiation is diphenylmethylenemalononitrile.

16. A composition as defined in claim 15 wherein the nitrocellulose is colored.

References Cited in the file of this patent

UNITED STATES PATENTS

| | | |
|---|---|---|
| 2,386,855 | Horback | Oct. 16, 1945 |
| 2,465,318 | Seymour | Mar. 22, 1949 |
| 2,579,543 | Brode et al. | Dec. 25, 1951 |
| 2,683,659 | Schlesinger et al. | July 13, 1954 |

OTHER REFERENCES

Kice: J. Am. Chem. Soc., volume 76, pages 6274–80 (particularly note page 6279), 1954. Copy in Div. 6 Library.)